Patented Oct. 11, 1949

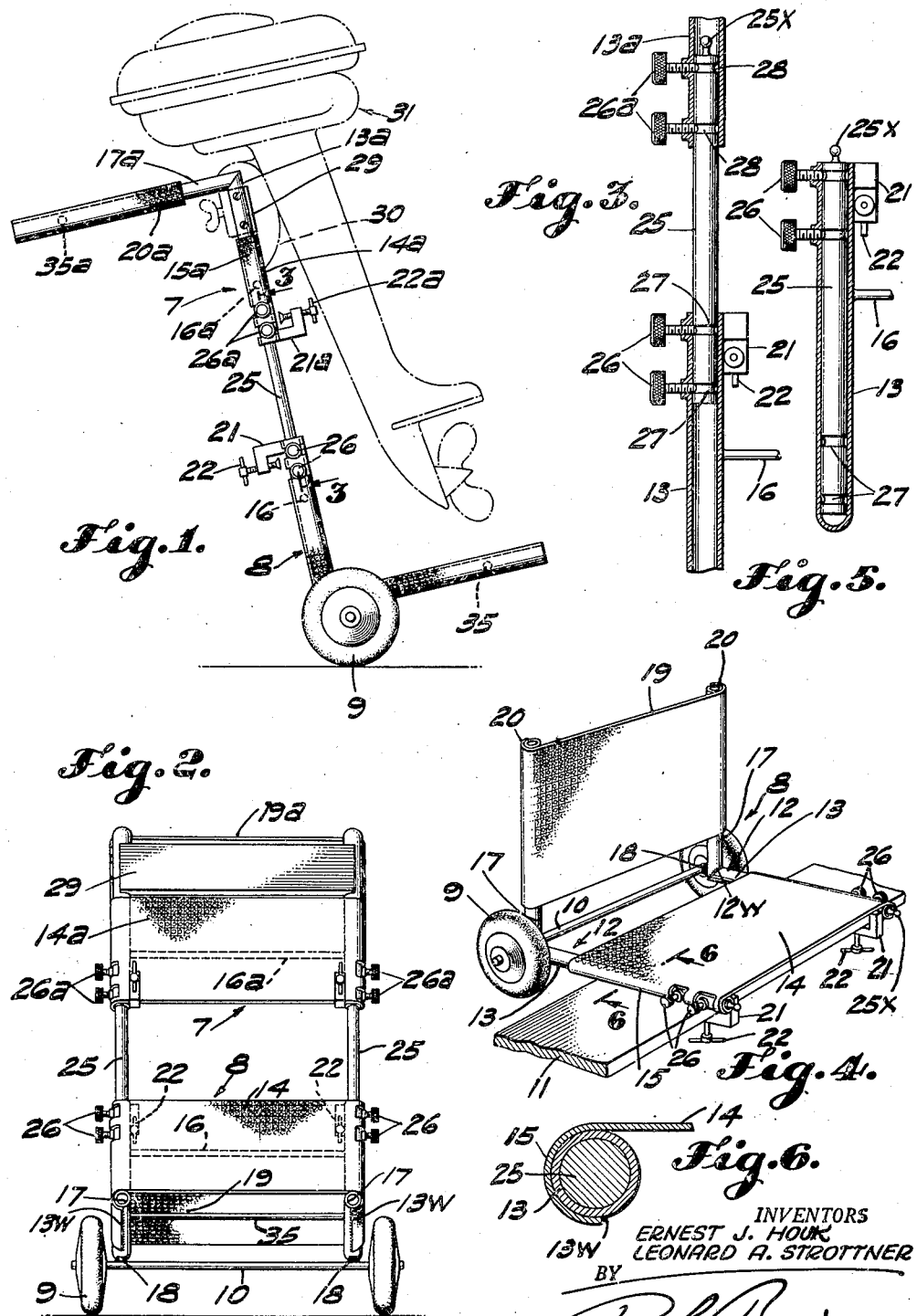

2,484,227

UNITED STATES PATENT OFFICE 2,484,227

BOAT SEAT FORMING HAND TRUCK FOR HANDLING OUTBOARD MOTORS

Ernest J. Houk, Los Angeles, and Leonard A. Strottner, Inglewood, Calif.

Application April 15, 1948, Serial No. 21,154

10 Claims. (Cl. 280—35)

This invention relates to a boat-seat forming hand truck for handling outboard motors.

It is not new in the art to which this invention pertains to provide a hand truck to transport an outboard motor from an automobile to a boat and back again from the boat to the automobile. But, so far as we are aware, no such truck has yet been provided which is convertible into a seat structure with a back rest and attachable to the backless seats commonly used in motor propelled boats.

Accordingly it is among the objects of this invention to provide a truck, not only capable of efficient use in transporting an outboard motor to and from a boat, but also convertible into a plurality of comfortable, back-carrying seats readily securable in a detachable manner to the conventionally, backless, boat seats.

Another object of the invention is to improve upon a truck of this kind by considerably increasing capacity without a corresponding increase in cost of manufacture, so that the truck will not only be utilizable to carry the motor, but also, at the same time, to carry lunch baskets, fishing tackle and other equipment for campers and travelers.

Other objects, advantages and features of invention will hereinafter appear.

Referring to the drawing wherein is shown a preferred embodiment of the invention as now reduced to practice, Fig. 1 is a side elevation of the truck showing the same in a tilted, load-carrying position and having mounted upon it an out-board motor, as indicated by broken lines.

Fig. 2 is a front elevation of the truck, per se, as positioned as in Fig. 1.

Fig. 3 is a fragmental longitudinal midsection of a telescopic rod structure which forms a part of the truck, taken on line 3—3 of Fig. 1, the scale being enlarged. Accessory parts are shown in side elevation.

Fig. 4 is a perspective view of the lower of the two seat-forming portions of the truck, shown attached to a boat seat, a fragment of which is included in the view.

Fig. 5 is a section similar to that of Fig. 3 except that the extensible section is shown completely telescoped within its housing.

Fig. 6 is an enlarged, fragmental section on line 6—6 of Fig. 4.

Referring in detail to the drawing, the truck frame consists of an upper unit 7 and a lower unit 8, each of these units being convertible into a seat forming structure, as will be best understood from Fig. 4 where the lower unit 8, which carries the ground wheels 9 on the axle 10, is shown detachably clamped to a conventional backless motor boat seat 11.

Describing additionally said lower unit 8 of the truck, two twin L-shaped, tubular members 12 are provided one at each side of said unit. The space between the tubular arms 13 of this unit is bridged by a foraminated sheet metal plate 14 welded to said arms at 13w where its curled edge portions 15 overlie said arms.

A brace rod 16 joins the arms 13 near their front ends, and their rear ends, as viewed in Fig. 4 are welded at 12w to the lower ends of the tubular, twin seat back frame members 17, the tubular members 13 and 17 joining each other at a right angle at each side of the structure to form said L-shaped members 12. This corner part of the frame is reinforced by the aforesaid axle 10, carrying at each end a lug 18 welded or otherwise secured both to the axle and to the frame. The seat back tubes 17 have the space between them bridged by a foraminated seat forming sheet metal plate 19 having curled side edge portions 20 welded or otherwise secured to the tubular members 17 similar to the welding on of the aforesaid curled edge portions 15.

Twin, angular clamp arms 21 are welded or otherwise secured to the outer end portions of the tubular members 13. Each of the clamp arms carries a hand operable clamping screw 22, thus completing a well known type of clamp structure shown in Fig. 4 gripping the front edge portion of the boat seat 11.

When the device is assembled into a truck-forming structure, as shown in Fig. 1, the plate 19 forms the floor portion of the truck and the tubular arms 13 are directed upwardly bringing the clamp arms 21 to an inoperative, out of the way position. In Figs. 1, 3 and 5 is shown one of the paired connecting rods 25 which, in Fig. 4 is concealed within the sleeves 13, though held in place by set screws 26 entering grooves 27 around the rods, see Fig. 3, showing also grooves 28 around said rod to receive set screws 26a. These rods have on their outer ends manually grippable, knobbed fingers 25x to aid the operator in pulling them out to the positions shown in Figs. 1 and 4. Said rods 25, in the truck, connect the upper unit 7 with the lower unit 8, it being understood that said two units are similarly constructed, so that, while one of them is attached to the boat seat 11 of Fig. 4 the other unit may likewise be attached to another of the boat's seats.

Since the upper unit is like the lower unit, except for the omission of the running gear and the addition of a brace plate 29 across its upper portion, corresponding parts of the two units are lettered in the same manner except for the addition of the letter "a" to the reference numbers pertaining to unit 7.

In their extended positions shown in Fig. 3, the upper end portions of the aforesaid rods 25 extend into the paired sleeves 13a of the upper unit 7, until their annular grooves 28 register with the pair of set screws 26a, and the annular grooves 27 register with the pair of set screws 26. When the various set screws have been screwed into the grooves provided for them, and the units 7 and 8 are positioned as shown in Fig. 1, the device is ready for use as a truck.

The apron or brace plate 29 in the truck structure is positioned to have applied to it a clamp member 30 for the purpose of securing to the truck the outboard motor 31, as indicated by broken lines in Fig. 1. The clamp arms 21a of Fig. 1 are operative only when the upper unit is attached to a boat seat, but they are not in the way in the truck for there is ample room between them for the motor 31.

A tie rod 35 bridges the space between and is secured to the tubular members 17 of the lower unit 8 and reinforces this unit, while a like tie rod 35a ties together and braces the tubular members 17a of the upper unit.

In using the device as a truck the operator will grasp the curled plate portions 20a in his hands when propelling the truck.

When the two units of the truck are to be disassembled preparatory to converting them into boat seats, the operator will first loosen the four set screws 26, 26a at each side of the truck sufficiently to withdraw their inner ends from the grooves 27 and 28, whereupon he will slide each of said rods farther into the tubular member at its side of the device, until the set screws 26 are again abuttable against the sides of the outer end portions of the rods 25 while the latter are housed in the tubular members 13, whereupon the set screws 26 are screwed down, this time not into grooves, but sufficiently tight frictionally to hold the rods in place, this being done preparatory to using the lower unit as a boat seat as shown in Fig. 4.

The operator will then dispose the seat-forming foraminated seat member 14 in an overlying relation to the boat seat 11, and will finally use the clamp elements 21 and 22 to secure said lower unit in place, as shown in Fig. 4, providing a seat with a back rest portion.

From what has been said about mounting the lower unit 8 upon the conventional boat seat 11 it will be readily understood how, in a like manner, to mount the upper unit 7 upon another of the boat's seats. In the case of the latter unit the limb of the frame carrying the foraminated plate 14a will be applied to the conventional boat seat by means of the clamp member 21a.

When the L-shaped units are assembled in the truck-forming relation the sheet metal plate 14 carried by the forwardly projecting arm of the L of the lower unit forms a luggage support upon which picnic baskets and the like may be supported at the same time that the upper part of the truck is used to support the motor 31.

We claim:

1. A hand operable motor truck comprising an L-shaped upper unit and an L-shaped lower unit, each of said units comprising a frame having an L-shaped member at each side, a foraminated sheet metal plate bridging the space between the arms forming the L-shaped members of each of said units whereby each unit is provided with a seat structure and a back rest structure, means spanning a space between said units and detachably connected to each of them to complete the truck, each of said units when detached from the other being securable to a backless boat seat to provide a seat having a back rest portion, and means carried by each unit for detachably securing it to said boat seat when one unit is detached from the other.

2. A hand operable motor truck comprising an L-shaped upper unit and an L-shaped lower unit, means spanning a space between said units and detachably connected to each of them to complete the truck, when said units are in the truck formation an arm portion of one of the L-shaped units alining with an arm portion of the other unit, a connecting rod telescoped into each of the alined arms, means clamping said connecting rod to both of said units when they are in the truck forming relation, and a running gear, including ground wheels carried by one of said units, in the truck one of the L arms of the latter unit projecting forwardly and an L arm of the other unit projecting rearwardly of the truck.

3. A hand operable truck comprising an upper unit graspable by the hands of the operator to propel the truck and a lower unit carrying running gear for the truck, means detachably connecting said units together, a seat structure and a back rest structure carried by said lower unit, the latter unit being securable to a conventional motor boat seat in a position to be used as a seat having a back for passengers when said units are detached from each other, and means carried by said lower unit for securing it to said motor boat seat when one unit is detached from the other.

4. A hand operable truck comprising an upper unit graspable by the hands of the operator to propel the truck and a lower unit carrying running gear for the truck, means detachably connecting said units together, a seat structure and a back rest structure connected to each of said upper and lower units, said lower unit and said upper unit in their detached relation each being attachable to a conventional boat seat to form for passengers seats having back rests, and means carried by each unit for detachably securing it to said boat seat when one unit is detached from the other.

5. In a device of the kind described, two units, each of said units comprising twin L-shaped members, means bridging the space between the arms forming the L-shaped members of each of said units to form a seat structure and a back rest structure, wheels carried by one of said units, manually operable means detachably connecting said units together in a Z-shaped fashion to form a hand operable truck wherein said wheeled unit forms a luggage support and the other unit forms a motor support, each of said units, when detached from the other being manually attachable to a backless motor boat seat to provide a seat having a back rest, and means carried by each unit for detachably connecting it to said boat seat when one unit is detached from the other.

6. A motor hand truck comprising an L-shaped upper unit and an L-shaped lower unit detachably connected together, each of said units when detached from the other being mountable in a motor boat as a passenger seat having a back rest portion, each of said units comprising a frame having an L-shaped tubular member at each side, in the assembled truck a pair of said tubular members of one unit axially alining with a pair of the tubular members of the other unit, a connecting rod telescoped into each of the alined tubular members, and means clamping said connecting rod to both of said units when they are in the truck-forming relation.

7. The subject matter of claim 6, and, when said L-shaped units are assembled to form a truck one of the limbs of the L of the upper unit projecting rearwardly and forming a hand-hold for the operator to grasp when propelling the truck.

8. The subject matter of claim 6 and, when said L-shaped units are assembled to form a truck one of the limbs of the L of the lower unit projecting forwardly and forming a floor portion of the truck utilizable to support baggage.

9. The combination defined in claim 6, in which one of said units is provided with means for detachably connecting it to a backless motor boat seat.

10. In a device of the kind described, two units, manually operable means detachably connecting said units together to form a hand operable truck, each of said units, when detached from the other, being manually attachable to a backless motor boat seat to provide a seat havng a back rest, means carried by each unit for securing it to said boat seat when one unit is detached from the other, each of said units as viewed from the side in the assembled truck, being L-shaped with a limb of one unit alining with a limb of the other unit, a connecting rod telescoped into each of the alined limbs, and means clamping said connecting rod to both of said units when they are in the truck forming relation.

ERNEST J. HOUK.
LEONARD A. STROTTNER.

REFERENCES CITED

The following references are of record in the file of this patent:

UNITED STATES PATENTS

| Number | Name | Date |
|---|---|---|
| 2,450,304 | Shiflet | Sept. 28, 1948 |